E. M. LARSON.
SPRING WHEEL.
APPLICATION FILED MAY 16, 1911.
1,012,374.
Patented Dec. 19, 1911.
2 SHEETS—SHEET 1.
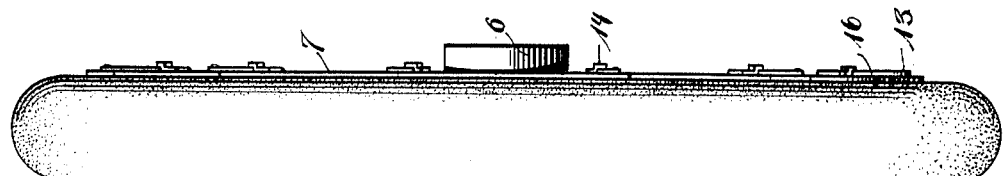
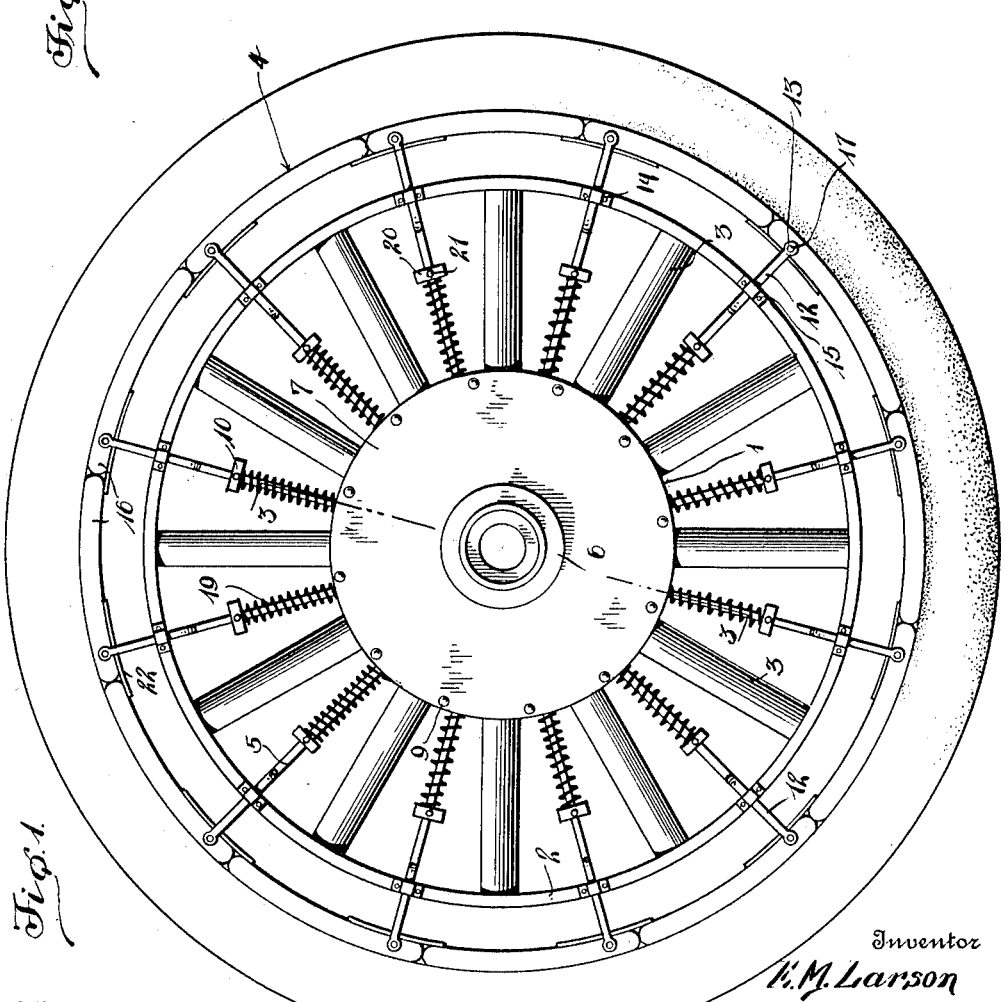

E. M. LARSON.
SPRING WHEEL.
APPLICATION FILED MAY 16, 1911.
1,012,374.
Patented Dec. 19, 1911.
2 SHEETS—SHEET 2.
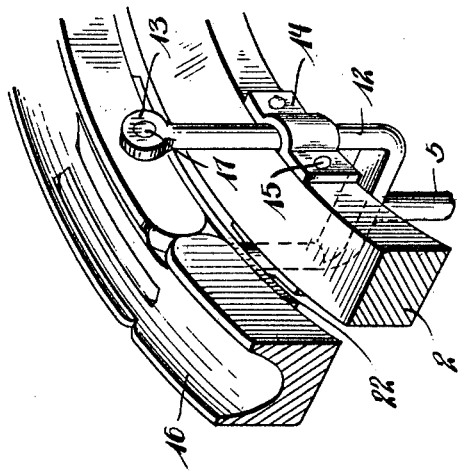
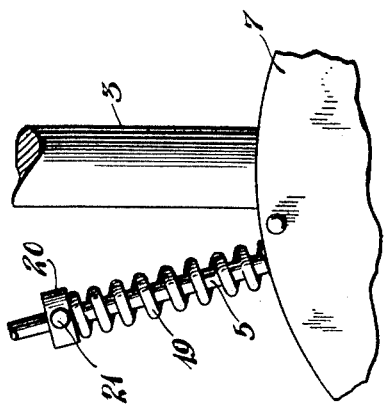
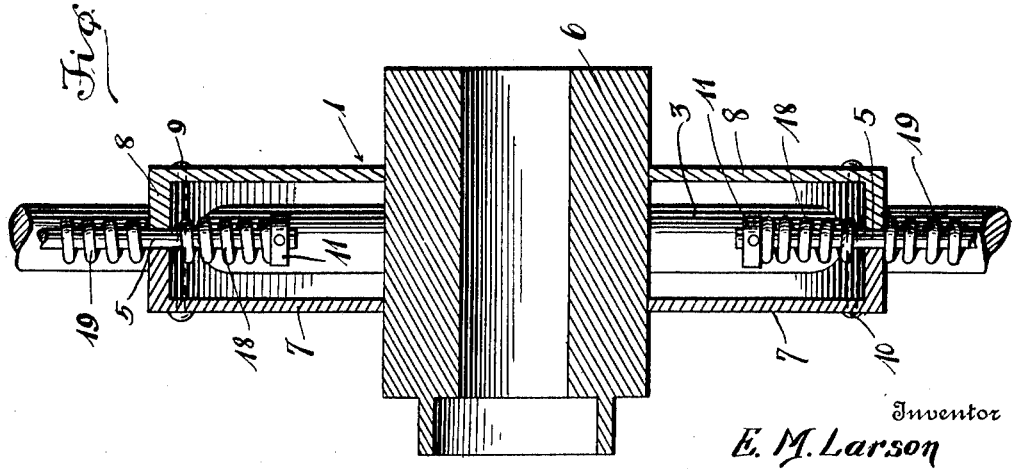
Witnesses
Ernest Crocker
W. H. Woodman
Inventor
E. M. Larson
By
Attorneys

UNITED STATES PATENT OFFICE.

EMIL M. LARSON, OF CANBY, MINNESOTA.

SPRING-WHEEL.

1,012,374. Specification of Letters Patent. Patented Dec. 19, 1911.

Application filed May 16, 1911. Serial No. 627,601.

*To all whom it may concern:*

Be it known that I, EMIL M. LARSON, a citizen of the United States, residing at Canby, in the county of Yellow Medicine, State of Minnesota, have invented certain new and useful Improvements in Spring-Wheels; and I do hereby declare the following to be a full, clear, and exact description of the invention, such as will enable others skilled in the art to which it appertains to make and use the same.

My invention relates to new and useful improvements in wheels, and more especially to spring wheels of that type in which the wheel proper is surrounded by an auxiliary tread which is spaced apart from the rim of the wheel and yieldably maintained in position by means of a plurality of auxiliary spokes which are slidably mounted in the hub and cushioned therein, and the object of my invention is to improve the construction and increase the efficiency of wheels of the above described character.

A further object of my invention is to provide means for absolutely preventing all independent rotation of the tread with respect to the wheel proper.

Another object of my invention is to provide a simple and novel means for connecting the auxiliary spokes to the tread of the wheel, said tread being composed of a plurality of members hinged together to form a continuous tread.

A further object of my invention is to provide yieldable reinforcing elements for strengthening the hinged portions of the tread, whereby all portions thereof will be equally capable of supporting the load. And a still further object of my invention is to provide means for regulating the springs by means of which the auxiliary spokes are cushioned in the hub to adapt the wheel for use with loads of various weights, thus causing the wheel to be equally resilient irrespective of the load carried.

With these and other objects in view my invention will be more fully described, illustrated in the drawings which show a preferred embodiment of my wheel, and then specifically pointed out in the claims which are attached to and form a part of this application.

In the accompanying drawings, Figure 1 is a side elevation of the wheel complete. Fig. 2 is a front elevation thereof. Fig. 3 is a section through the line 3—3 of Fig. 1. Fig. 4 is a detail perspective of a portion of the wheel showing the means by which the auxiliary spokes are secured to the rim of the wheel and to the tread thereof. Fig. 5 is a side elevation upon an enlarged scale, of a portion of the wheel showing means for adjusting the cushioning springs of the auxiliary spokes, the hub being shown partially broken away.

Referring more specifically to the drawings, in which similar reference numerals designate corresponding parts throughout, it will be seen that my wheel consists primarily of a hub portion which is designated as a whole by the numeral 1, a rim 2, spokes 3, a tread member which is designated in general by the numeral 4, and the auxiliary spokes 5.

The hub 1 consists of a hub proper 6 of the usual construction and in which are secured the inner ends of the spokes 3, and of a pair of disks 7, preferably formed of metal and which are provided with centrally located bores by means of which they are seated upon the hub 1, one upon either side of the spokes, as best shown in Fig. 3 of the drawings. The peripheral edge of each of these disks is provided with a laterally extending annular flange 8 the edges of which are provided with a plurality of semi-cylindrical recesses adapted to engage around the spokes 3 when the disks are in position, said disks being secured in place and to each other by means of a plurality of bolts 9 and nuts 10. Intermediate between each of the spokes 3 and their adjacent spokes the flanges 8 are further provided with recesses which co-act to form a plurality of bearings through which the auxiliary spokes 5 are slidably mounted. Threaded upon the inner ends of the auxiliary spokes 5 are the nuts 11, the purpose of which will be hereinafter explained. The upper ends of these spokes terminate in yoke members 12, the side arms of which straddle the rim 3, extend beyond the same, and terminate in perforated end portions 13. U-shaped clips 14 one for each of the yoke arms are secured to the rim by bolts or other suitable means 15, in such a manner as to firmly secure the auxiliary spokes to the rim in their proper position with respect to the main spokes 3, while at the same time permitting free radial motion of the spokes.

The tread member 4 consists of a plurality of curved metal plates 16 which are U-shaped in transverse section and which are hingedly connected to each other by means of pintle bolts 17 to form a continuous tread member. The width of these tread members is such that it exactly fits between the yoke arms and said members are secured in place by passing the pintle bolts of the hinges through the perforations of the yoke arms.

Surrounding that portion of each of the spokes 5 which is inclosed in the hub is a strong helical spring 18 one end of which bears against a nut 11 while the other end bears against the inner faces of the flanges 8. Surrounding each of the spokes 5, without the hub, is a second helical spring 19, one end of which rests against the outer faces of the flanges 8 while the other end bears against a collar 20 which is slidably mounted upon the spoke and adapted to be secured in adjusted position thereon by means of a set-screw or other preferred device 21.

A plurality of leaf springs 22 are each firmly secured by one end to the inner face of the tread member 4, one of said springs being positioned under each of the hinges of the tread. As will be readily understood these springs serve to yieldably reinforce the hinges of the tread, thus equalizing its strength and adapting it to withstand pressure equally well at all parts.

From the foregoing description it will be clear that the tread surrounds the rim of the wheel and that all parts thereof are normally held equidistant therefrom by means of the springs 18 and 19 and it will also be apparent that all load placed upon the wheel will be resiliently supported thereby, the springs 19 of the lower portion of the wheel being assisted in this action by the springs 18 of the upper portion thereof. By providing two sets of springs as described, a portion of the springs are always at rest thus greatly increasing the length of the life of the wheel in comparison to that of wheels of a similar type in which all of the springs are at all times distorted.

The U-shaped clips 14 maintain the spokes 5 in their proper position radially with respect to the hub, while at the same time permitting free radial movement thereof. By this means all independent motion of the tread with respect to the rim of the wheel and consequently to the hub thereof is avoided, which is a great advantage, in fact an indispensable one, in wheels which are to be used as the drive wheels of motor vehicles. It will further be seen that I have greatly simplified while at the same time I have in no way weakened, the construction of the wheel by the peculiar manner in which I have secured the auxiliary spokes to the tread of the wheel, by utilizing the pintle bolts of the tread hinges as a securing means for the spokes.

The adjustable collars 20 form an extremely simple and efficient means for regulating the tension of the springs as they become weak through wear, or when an exceptionally heavy load is to be carried. These springs should however be so proportioned as to be strong enough to support the wheel proper clear from the tread under any ordinary conditions of load or road.

I have described the tread members as being U-shaped in transverse section in order to adapt them for use with the customary form of resilient tires, but it will be understood that it may be made rectangular in section if desired to adapt them for use without a tire, without in any way departing from the spirit of my invention.

What I claim is:—

1. A wheel, comprising a hub, a rim, a plurality of spokes connecting the hub and rim, a sectional tread surrounding said rim and spaced therefrom, said tread being composed of a plurality of tread members the ends of which are hingedly secured together by pintle bolts, a plurality of auxiliary spokes slidably mounted in said hub, the outer ends of said auxiliary spokes terminating in yokes which straddle said rim, the free ends of said yokes being secured to the tread by means of the pintle bolts of the hinges thereof, a plurality of U-shaped clips secured to the rim and engaging said yokes to maintain the same in proper position with respect to the spokes while at the same time permitting radial motion of the auxiliary spokes, and cushioning means between said auxiliary spokes and the hub.

2. A wheel, comprising an inner hub member, an outer hub member carried thereby and consisting of a pair of spaced apart disks having upon their peripheral edges laterally extending annular flanges the edges of which are adapted to bear against each other, a rim, a plurality of spokes extending through said outer hub member with their outer ends secured to said rim and with their inner ends secured to the inner hub member, a sectional tread member surrounding said rim and spaced therefrom, a plurality of auxiliary spokes having their outer ends secured to said tread member and having their inner ends slidably mounted in said outer hub member, nuts carried by the inner ends of said auxiliary spokes, helical springs surrounding those portions of the auxiliary spokes which are within said outer hub member, one end of each of said springs bearing against one of said nuts, while the other end bears against the inner faces of the flanges of said hub member, a plurality of helical springs surrounding said auxiliary spokes with their lower ends resting against the outer faces of the flanges of said outer hub member, a plurality of collars slidably mounted upon said auxiliary spokes and adapted to bear against the opposite ends of said latter mentioned springs, and means for securing said collars in adjusted position upon the spokes.

In testimony whereof, I affix my signature, in the presence of two witnesses.

EMIL M. LARSON.

Witnesses:
H. T. SORKNES,
A. S. JOHNSON.

Copies of this patent may be obtained for five cents each, by addressing the "Commissioner of Patents, Washington, D. C."